United States Patent [19]

LaBerdia

[11] 4,286,915

[45] Sep. 1, 1981

[54] STRADDLE CARRIER

[75] Inventor: William L. LaBerdia, Peoria, Ill.

[73] Assignee: Kress Corporation, Brimfield, Ill.

[21] Appl. No.: 80,283

[22] Filed: Oct. 1, 1979

[51] Int. Cl.³ .............................................. B60P 1/02

[52] U.S. Cl. ................................ 414/460; 294/67 BC

[58] Field of Search ................................ 414/458–461, 414/495; 294/88, 67 BC, 67 DB, 81 SF

[56] References Cited

U.S. PATENT DOCUMENTS

| | | | |
|---|---|---|---|
| 3,184,087 | 5/1965 | Prindle et al. | 414/459 |
| 4,155,471 | 5/1979 | Yancy | 414/458 |

FOREIGN PATENT DOCUMENTS

| | | | |
|---|---|---|---|
| 1406121 | 9/1975 | United Kingdom | 414/459 |
| 200445 | 3/1965 | U.S.S.R. | 414/459 |
| 294763 | 9/1969 | U.S.S.R. | 414/495 |

*Primary Examiner*—Robert W. Salfer

[57] ABSTRACT

A straddle carrier for heavy loads of the type which is driven over a load so that the load is generally beneath the carrier and straddled by the wheels of the carrier. The carrier includes a main frame which has a gripping tong mechanism integrally mounted thereon for clamping the load. The entire main frame and tong assembly may be raised and lowered to permit handling the load by means of cylinder/strut arrangements at each of the four wheels. A pair of hydraulically actuated steering cross bars are pivotally connected to the front and rear wheels, respectively, in order to steer the straddle carrier. Mounted on the main frame, and like the main frame lowered and raised relative to the wheels, are an operator's cab and a motor and pump housing for driving the straddle carrier and actuating the various hydraulic cylinders of the carrier.

7 Claims, 4 Drawing Figures

STRADDLE CARRIER

DESCRIPTION OF THE INVENTION

This invention relates generally to straddle carriers for heavy loads such as steel slabs and the like and more particularly concerns such a straddle carrier which has a common main frame for the operator's cab and the load-gripping mechanism, this frame being operable to be raised and lowered relative to the ground-engaging straddle carrier wheels.

Straddle carriers are used for transporting heavy loads such as steel slabs, weighing tens of tons. A typical straddle carrier is a large, four-wheeled, motorized vehicle having an elevated cab-bearing platform. The straddle carrier includes a load handling mechanism which is mounted beneath the platform of the straddle carrier and also means for raising and lowering the load handling mechanism. This load handling mechanism includes a frame, separate from the frame of the cab-bearing platform, upon which gripping means such as tongs are mounted for gripping the load. The load handling mechanism further includes actuating means for moving the tongs or other gripping members between a position gripping the load and a position wherein the load is released.

In order to operate such a presently existing load handling straddle carrier, the carrier is driven over a load, the load handling mechanism is lowered with tongs separated over the load, the tongs are actuated to grip the load, the load handling mechanism and the load are raised to a carrying position, and the straddle carrier is driven to a desired location for unloading.

Most load handling equipment is designed from the ground up based upon the total loaded weight, i.e. the weight of the vehicle itself plus the payload. In a load handling straddle carrier such as has been described above, the use of both a cab-bearing platform frame and a separate load handling mechanism frame results in the weight of the carrier components often exceeding the weight of the load. For example, a typical unloaded straddle carrier of the type described might weigh 26 tons and have a load capacity of less than 23 tons, at the tong points, resulting in a payload-to-weight ratio of about 0.88.

It is therefore an object of this invention to provide a load handling straddle carrier having an improved payload-to-weight ratio. It is a further object of the present invention to provide such a straddle carrier which avoids the reduction of potential load weight due to the use of separate load handling and cab-bearing platform frames.

Other objects and advantages of the invention will become apparent upon reading the following detailed description and upon reference to the drawings, in which.

Figure 1:
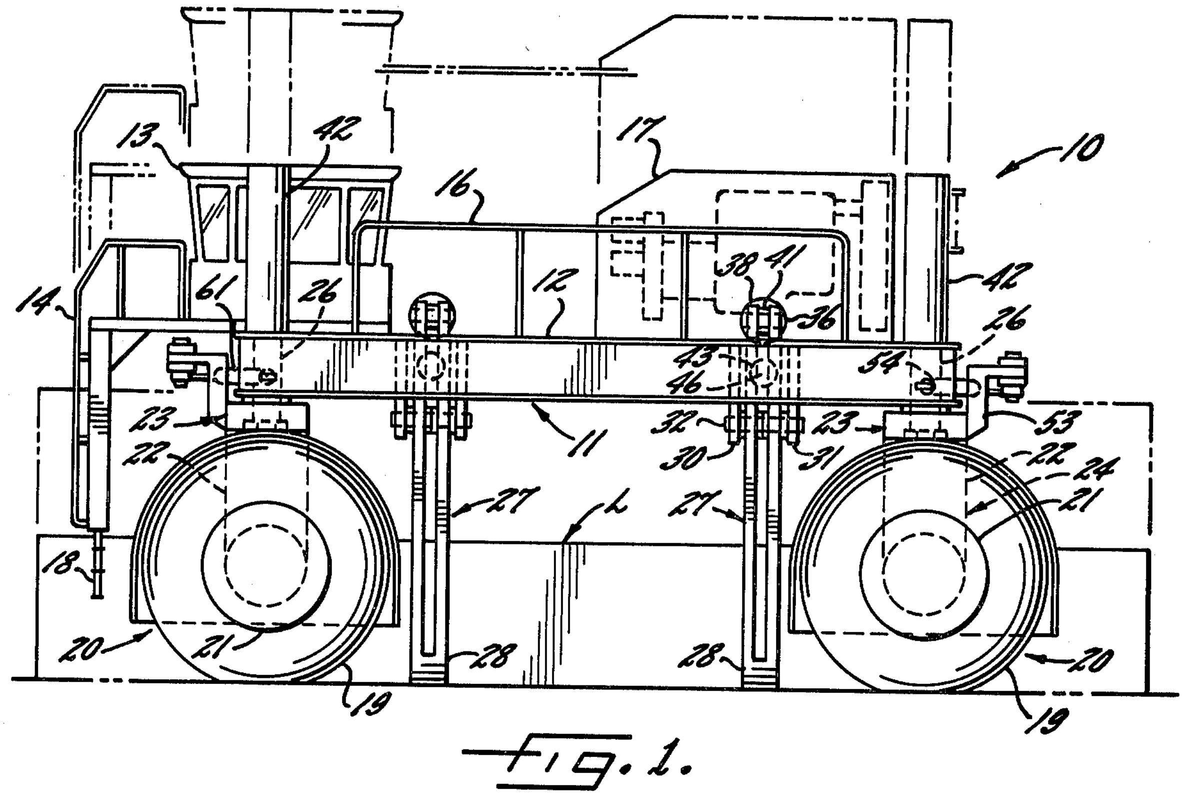
FIG. 1 is a side view of a straddle carrier according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Turning now to Figures, a straddle carrier 10 is shown which has a frame 11 encompassing a platform 12, mounted upon which there is an operator's cab 13. The operating controls for the straddle carrier 10 are located in cab 13, and an operator in the cab is provided a view of a load beneath the straddle carrier 10 through appropriate apertures or windows (not shown) in the platform. Steps 18 with hand rails 14 provide access to the platform 12 for the operator, and appropriate safety equipment such as a guard rail 16 is provided for persons moving about the platform 12. A motor housing 17 on the platform 12 encloses a motor driven hydraulic pump for providing pressurized hydraulic fluid to operate various hydraulic cylinders, to be described hereinafter, and to provide a hydrostatic drive for the straddle carrier wheels.

The straddle carrier includes four ground-engaging wheels 20, each having a tire 19 mounted on a rim 21. A wheel carrying member 22 is mounted on each wheel axle, the axle being rotatably received by the wheel carrying member. The wheel carrying member 22 has a downwardly extending portion 24 which receives the wheel axle, and the wheel carrying member also has an essentially horizontal upper portion 23 which includes means for attaching steering elements for the straddle carrier, as shall be described hereinafter. The upper portion 23 of the wheel carrying member 22 further has rigidly attached thereto an upwardly extending rod 26, which is received in a cylinder 42 associated with the frame 11 for raising and lowering the frame 11 and platform 12, as shall also be described more particular hereinafter.

In accordance with the invention, two pairs of load-engaging tongs 27 are pivotally mounted on the frame 11. The pairs of tongs 27 are similar and are also similarly mounted and controlled, so only the rear pair of tongs 27, including a tong 28 and a tong 29, shall be described in detail. The upper portion of the tong 28 is pivotally mounted between two downwardly extending ears 30 and 31 of the frame 11 by a pin 32. Similarly, the tong 29 is pivotally mounted at its upper end between a pair of downwardly extending ears 33 and 35 of the frame 11 by a pin 34. For the purpose of pivoting the lower ends of the tongs together to grip a load an apart to release a load, the upper portion of the tong 28 is pivotally attached to a hydraulic cylinder 38. Similarly, the upper portion of the tong 29 is pivotally attached to a piston rod 39 received in hydraulic cylinder 38.

Figure 3:
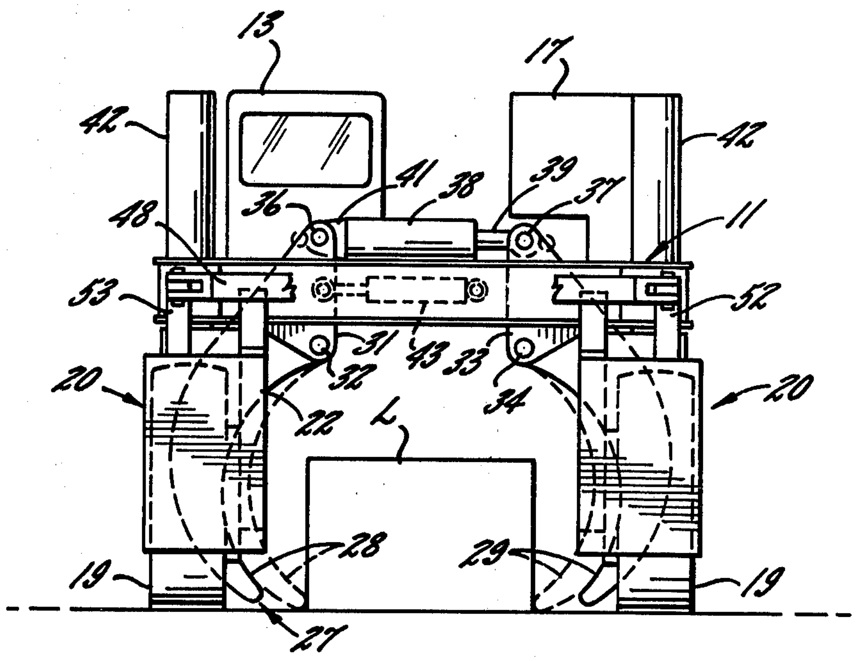
FIG. 3 is an end view of the straddle carrier of FIG. 1 with a portion of the steering mechanism removed, showing two load-gripping tong locations.
Figure 4:
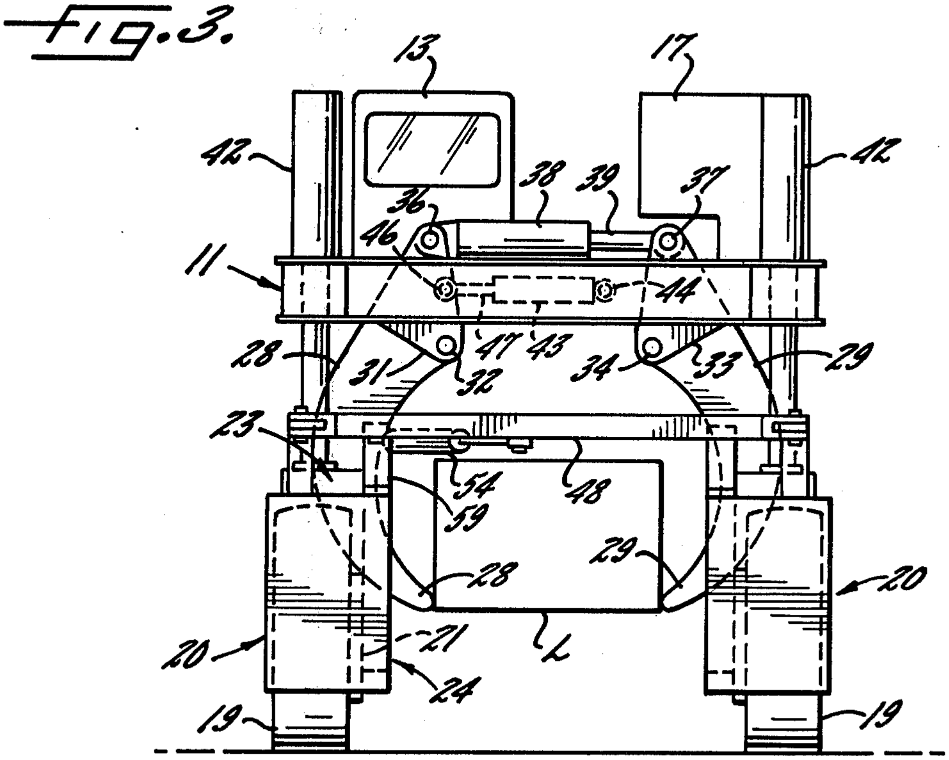
FIG. 4 is an end view similar to FIG. 3 but showing the frame and load in their elevated, carrying, position.

To hold the lower tong ends in a spaced apart relationship, such as for positioning the tongs on either side of a load, the hydraulic cylinder 38 is actuated to retract the rod 39 so that the tongs 28 and 29 pivot on the pins 32 and 34, respectively, drawing the upper portions of the tongs together and separating the lower end portions of the tongs. The tongs 28 and 29 are shown in solid lines in FIG. 3 in this spaced apart relationship. The dashed line showing of the tongs 28 and 29 in FIG. 3 illustrates the position of the lower tong ends moved together in engagement with a load L. To place the lower tong ends in this load engaging position, the hydraulic cylinder 38 is actuated to extend the rod 39 to the position as shown in FIG. 4.

The tongs 28 and 29 are bifurcated with the upper portions of the tongs being received on either side of a flange 41 of the cylinder 38 and attached for pivotal connections by a pin 36. Similarly, the end of the rod 39 is pivotally attached by a pin 37 within the bifurcated upper end of the tong 29.

In order to lift a load L, the tong pairs 27 are actuated by the hydraulic cylinders 38 to grip the load, and the frame 11 upon which the tong pairs are mounted is raised and lowered on the four rods 26 associated with the wheels. The rods 26 are received in hydraulic cylinders 42 which are rigidly attached to the frame 11. The hydraulic cylinders 42 may be activated to extend the rods 26 to raise the frame 11 and the tong pairs 27 to a carrying position for movement of the straddle carrier and, conversely, may be activated to retract the rods 26 to lower the frame and tong pairs to pick up a load or unload. The cylinders 42 in the preferred construction are of the type disclosed in U.S. Pat. No. 3,722,874, which includes both a compressible and a non-compressible fluid in order to provide shock absorption within the cylinder itself in addition to providing lifting and lowering capability. The operation of the hydraulic cylinders 42 is controlled by an operator in the cab 13.

In order to steer the straddle carrier 10, hydraulically controlled steering cross bars 48 and 62 are provided between the front pair of wheels and the rear pair of wheels. Since the steering assemblies operate in similar fashion, only the rear steering mechanism shall be described in detail. To turn the rear wheels, a steering cross bar 48 is pivotally attached by pins 49 and 51 to cross bar support brackets 52 and 53, respectively. The steering cross bar support bracket 53 is rigidly attached to the upper portion 23 of the wheel carrying member 22. The bracket 53 extends upwardly from the upper portion of the wheel carrying member to provide clearance for a load such as L. The bracket 52 is similarly rigidly attached to the upper portion of its associated wheel carrying member 22.

For the purpose of turning the rear wheels of the straddle carrier 10, a hydraulically actuated cylinder 54 with a rod 56 is pivotally attached between the steering cross bar 48 and the wheel carrying member 22. The steering control cylinder 54 is hydraulically controlled from the cab 13, and when the rod 56 is extended, the steering cross bar 48, and hence the rear wheels, rotate counterclockwise as viewed from the top in FIG. 2. In similar fashion, when the steering rod 56 is retracted by the hydraulic cylinder 54, the steering cross bar 48 and the rear wheels rotate clockwise.

A pin 57 pivotally connects the end of the steering rod 56 to the steering cross bar 48, and the end of the steering cylinder 54 is pivotally connected by a pin 58 to an upwardly extending steering support bracket 59 which is rigidly mounted on the top portion 23 of the wheel carrying member 22. A similar steering cylinder 61 is provided for a steering cross bar 62 for the front wheels and operates in the same manner as the rear steering assembly. The front and rear steering mechanisms are separately operable, enhancing the maneuverability of the straddle carrier.

The various cylinders of the straddle carrier 10 are controlled from the cab 13 by an operator through hydraulic lines running to the various cylinders. A sufficiently flexible connection is made to the steering cylinders 54 and 61 in order to accommodate the distance of travel of the frame 11 relative to the wheels. Hydrostatic drive for at least one pair of wheels of the straddle carrier 10 is provided with drive control also in the cab 13 for the operator of the straddle carrier.

So far as has been described, when the frame 11 is in its raised position, the tong pairs 27 may swing laterally, or when cornering. With reference, for example, to FIG. 3, the pins 32, 34, 36 and 37 define a quadrilateral whose apices represent pivotal connections to the tongs 28 and 29. With the tong 28 pivotally attached to the frame 11 by pin 32 and with the tong 29 pivotally attached to the frame 11 by pin 34, there is a tendancy for the tongs to swing laterally with the cylinder 38 and its associated rod 39 fixed relative to one another but moving laterally relative to the frame. The resultant pivoting of the upper portions of the tongs 28 and 29 about the pins 32 and 34, respectively, results in an even greater lateral motion of the lower ends of the tongs. In order to stabilize the tong pairs 27, an additional tong-stabilizing cylinder 43 is provided for each of the front and rear pairs 27. Describing the cylinder associated with the rear pair of tongs 28 and 29, the stabilizing cylinder 43 is attached at an end 44 to the frame 11 and has an associated rod 47 which is attached at an end 46 to the tong 28. When the tong pairs 27 are raised, the cylinder 43 is hydraulically actuated by the operator of the straddle carrier to restrain the tongs from swinging.

Figure 2:
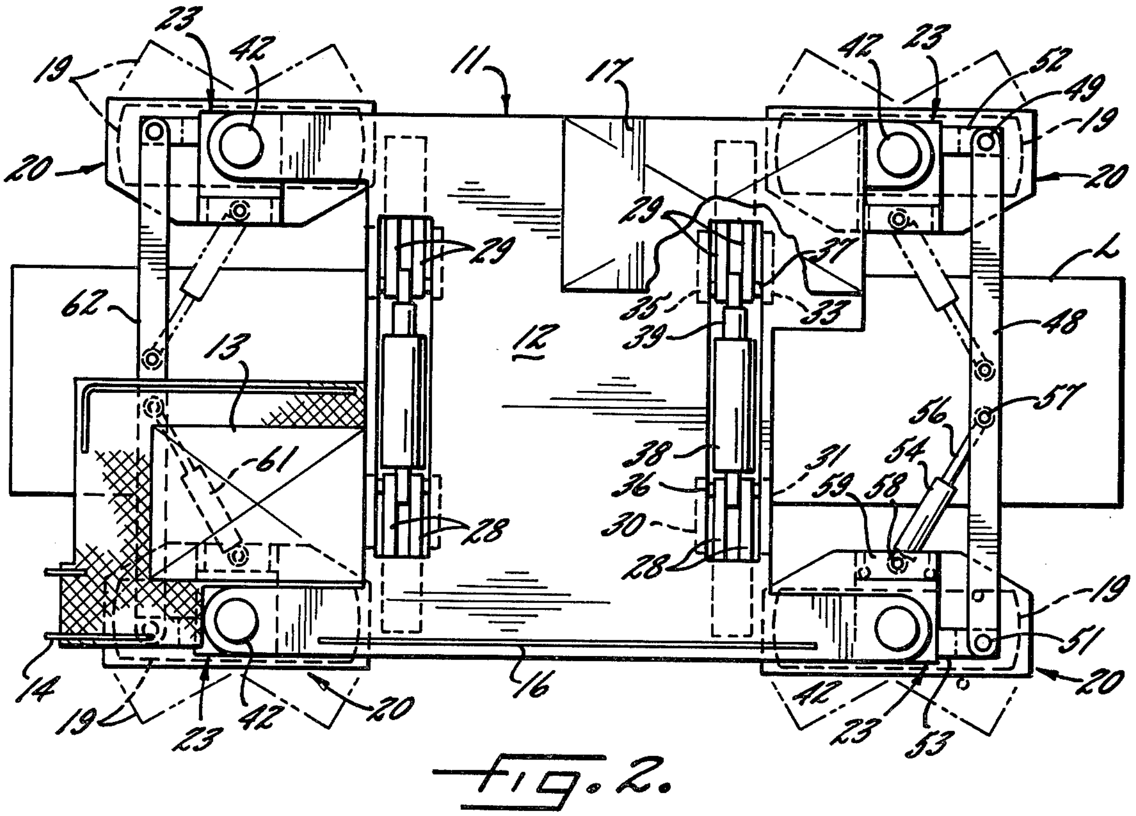
FIG. 2 is a top view of the straddle carrier of FIG. 1, with a portion of a pump housing removed.

In operation, the straddle carrier 10 is driven by an operator with the tong pairs 27 and the frame 11 in an elevated position. The straddle carrier 10 is then driven into a loading position relative to a load L, as shown in FIGS. 1 through 3. The tong pairs 27 are then lowered as shown in FIG. 3 in solid lines to generally encompass the load L. Next the cylinder 38 is activated by the straddle carrier operator from the cab 13 to extend the rod 39, bringing the lower ends of the tongs together to grip the load L as shown in dashed lines in FIG. 3. The frame-lifting cylinders 42 are then activated by the operator in the cab 13 to raise the frame 11, the tong pairs 27, and the load L to a raised, carrying position as shown in FIG. 4. The straddle carrier 10 is driven by the operator to the desired location for unloading the load L. Unloading is accomplished by lowering the frame 11, the tong pairs 27, and the load L, and activating each tong cylinder 38, front and rear, to retract its associated rod 39, thereby separating the lower ends of the tongs.

While the straddle carrier 10 has been shown incorporating the particular tong pairs 27, other types of gripping members may be used depending upon the particular shape of a load which is to be carried.

With the integral tong and cab-bearing frame construction illustrated herein, a load may be carried which exceeds the total straddle carrier weight. For example, it is contemplated that a straddle carrier of the presently disclosed construction having a total weight of about 40 tons would be able to carry a load of up to 60 tons.

While neither specific hydraulic pump and line connection details nor specific hydrostatic drive particulars have been illustrated, their implementation is well within the state of the art. The essential consideration is that the connections to the lifting and steering drives and the drive for the wheels are not affected by the relative motion between the frame and the wheels.

It can be seen, therefore, from the foregoing description, that a heavy load handling straddle carrier has been described which has among other advantages an improved load-to-weight ratio, eliminating the use of a separate main frame and gripping mechanism frame.

What is claimed is:

1. A straddle carrier for heavy loads comprising:

a plurality of spaced-apart, ground-engaging wheels, the relative positions of the wheels generally defining a loadencompassing area;

a main frame supported by the wheels for vertical movement relative to the wheels;

means for raising and lowering the main frame and the gripping means relative to the wheels;

gripping means mounted on the main frame for gripping a load in the load-encompassing area, the gripping means comprising at least one pair of opposed gripping members each pivotally mounted to the main frame, each of the gripping members having an upwardly extending portion beyond the point of pivotal connection to the main frame and a downwardly extending portion beneath the point of pivotal connection, the gripping means further comprising a selectively extensible hydraulic cylinder and associated rod connected between the upper portions of the pair of opposing members; and stabilizing means connected between one of the gripping members and the main frame to prevent the pivoting of said one member relative to the main frame and thereby prevent relative movement between the members, a gripped load and the main frame while the carrier is in motion.

2. The straddle carrier of claim 1 in which the means for raising and lowering the main frame comprises a plurality of hydraulic cylinders, one of said cylinders being associated with each of said wheels, each cylinder having an associated rod and being mounted to the straddle carrier such that relative motion between the rod and the cylinder effects relative vertical movement of the main frame relative to the wheels.

3. The straddle carrier of claim 1 in which the pair of opposed gripping members is a pair of gripping tongs which clamp against the sides of the load upon extension of the hydraulic cylinder.

4. The straddle carrier of claim 3 in which the gripping means comprises two pairs of tongs.

5. The straddle carrier of claim 1 or 2 which further comprises an operator's cab and a hydraulic pump and housing mounted on the main frame.

6. The straddle carrier of either of claims 1, or 2 in which there are four spaced-apart, ground-engaging wheels.

7. The straddle carrier of claim 1, the stabilizing means comprising a second, hydraulic cylinder and associated rod, the second hydraulic cylinder being selectively lockable to prevent the pivoting of the said one member relative to the main frame.

* * * * *